(12) United States Patent
Ishida et al.

(10) Patent No.: US 9,423,491 B2
(45) Date of Patent: Aug. 23, 2016

(54) RADAR DEVICE

(71) Applicants: Furukawa Electric Co., Ltd., Tokyo (JP); Furukawa Automotive Systems Inc., Shiga (JP)

(72) Inventors: Yoshiyuki Ishida, Tokyo (JP); Sadao Matsushima, Tokyo (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 14/844,636

(22) Filed: Sep. 3, 2015

(65) Prior Publication Data

US 2015/0378006 A1 Dec. 31, 2015

Related U.S. Application Data

(63) Continuation of application No. PCT/JP2013/062654, filed on Apr. 30, 2013.

(51) Int. Cl.
*G01S 7/03* (2006.01)
*G01S 7/02* (2006.01)
*G01S 13/93* (2006.01)
(Continued)

(52) U.S. Cl.
CPC .. *G01S 7/03* (2013.01); *G01S 7/02* (2013.01); *G01S 7/038* (2013.01); *G01S 13/931* (2013.01); *H01Q 1/3283* (2013.01); *H01Q 17/00* (2013.01); *H01Q 19/005* (2013.01);
(Continued)

(58) Field of Classification Search
CPC ........ G01S 7/03; G01S 7/038; G01S 13/931; G01S 7/02; G01S 2007/027; G01S 2013/9389; H01Q 19/005; H01Q 1/3283; H01Q 19/021; H01Q 17/00; H01Q 21/065
USPC ..................... 342/175, 159, 70–72
See application file for complete search history.

(56) References Cited

U.S. PATENT DOCUMENTS 5,325,099 A * 6/1994 Nemit ..................... G01S 7/032
 342/202
6,384,781 B1 * 5/2002 Kautz .................... H01Q 3/267
 342/174

(Continued)

FOREIGN PATENT DOCUMENTS

CN 1696735 A 11/2005
CN 102792179 A 11/2012
(Continued)

OTHER PUBLICATIONS

International Search Report and Written Opinion dated May 28, 2013 for PCT/JP2013/062654.
(Continued)

*Primary Examiner* — John B Sotomayor
(74) *Attorney, Agent, or Firm* — Thompson Coburn LLP (57) ABSTRACT

A radar device that transmits a high frequency signal and detects an object by a reflected wave that is reflected by the object includes a transmitting antenna that transmits the high frequency signal, a receiving antenna that receives a reflected wave that is transmitted by the transmitting antenna and reflected by the object, and a dummy antenna that attenuates a reflected wave that is reflected by a structure arranged on a transmission path of the high frequency signal. The dummy antenna is configured be selectable as an antenna having another function.

10 Claims, 8 Drawing Sheets

(51) Int. Cl.
*H01Q 1/32* (2006.01)
*H01Q 17/00* (2006.01)
*H01Q 19/00* (2006.01)
*H01Q 19/02* (2006.01)
*H01Q 21/06* (2006.01)

(52) U.S. Cl.
CPC ......... *H01Q 19/021* (2013.01); *H01Q 21/065* (2013.01); *G01S 2007/027* (2013.01); *G01S 2013/9389* (2013.01)

(56) References Cited

U.S. PATENT DOCUMENTS

| | | | |
|---|---|---|---|
| 2002/0105456 | A1 | 8/2002 | Isaji |
| 2008/0252524 | A1* | 10/2008 | Chu ..................... H01Q 3/2682 342/375 |
| 2013/0002471 | A1 | 1/2013 | Takahashi et al. |
| 2013/0050008 | A1* | 2/2013 | Atkins ................... G01S 13/89 342/22 |
| 2013/0187808 | A1* | 7/2013 | Kim ........................ G01S 7/032 342/175 |

FOREIGN PATENT DOCUMENTS

| | | |
|---|---|---|
| DE | 10-2013-000858 A1 | 7/2013 |
| JP | H03-148082 A | 6/1991 |
| JP | H03-226690 A | 10/1991 |
| JP | H11-330847 A | 11/1999 |
| JP | 2001-099912 A | 4/2001 |
| JP | 2004-093292 A | 3/2004 |
| JP | 2006-317162 A | 11/2006 |
| JP | 2008-249678 A | 10/2008 |
| JP | 2009-109333 A | 5/2009 |
| JP | 2010-109890 A | 5/2010 |
| JP | 2010-197283 A | 9/2010 |
| JP | 2011-193133 A | 9/2011 |
| JP | 2011-242170 A | 12/2011 |

OTHER PUBLICATIONS

English translation of the Written Opinion of the International Search Authority for PCT/JP2013/062654 dated May 28, 2013.
English translation of the International Preliminary Report on Patentability (Chapter I) for PCT/JP2013/062654 dated Nov. 3, 2015.
Office Action dated Oct. 26, 2015 from corresponding Chinese Application No. 201380019433.5.

* cited by examiner

RADAR DEVICE

CROSS REFERENCE TO RELATED APPLICATIONS

This is a continuation application of International Patent Application No. PCT/JP2013/062654 filed Apr. 30, 2013, the full content of which is hereby incorporated by reference in its entirety.

BACKGROUND

1. Technical Field

The present disclosure relates to a radar device.

2. Background Art

A vehicle-mount radar device of the related art is, for example, arranged on a back side of a bumper of a vehicle and can detect a position, a direction, a distance, a velocity, etc., of an object by transmitting a transmission wave that penetrates through the bumper, receiving a reflected wave that is reflected by an object, and analyzing a relationship between the transmission wave and the reflected wave.

Although the bumper is constituted by a member made of a resin or the like that is permeable to electromagnetic waves, depending on a positional relationship between an antenna and the bumper, there may be a case in a pulse radar where a radio wave transmitted from a transmitting antenna is reflected on the bumper and a reflected radio wave is reflected on a radar again, and an object is detected as if there are a plurality of objects.

Figure 16:
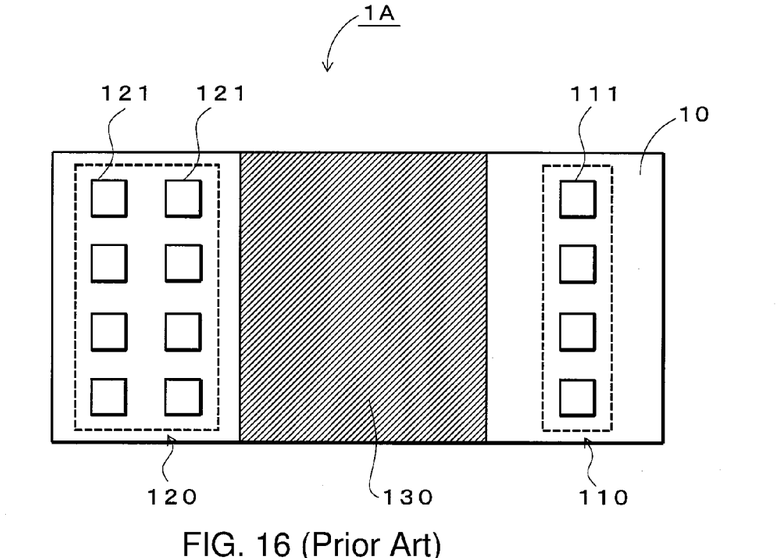
FIG. 16 shows an example of a substrate of a radar of the related art.

FIG. 16 is a plan view showing a substrate on which antennas of the radar device of the related art are formed. As shown in FIG. 16, a substrate 10 of a radar device 1A of the related art is provided with a GND (Ground) copper foil section 130 at the center thereof and a plurality of (in FIG. 16, four) antenna units 111 on a right-hand side thereof that are arrayed to form a transmitting antenna 110. Further, a plurality of (in FIG. 16, eight) antenna units 121 are provided on a left-hand side of the GND copper foil section 130 and are arrayed to form a receiving antenna 120.

Figure 17:
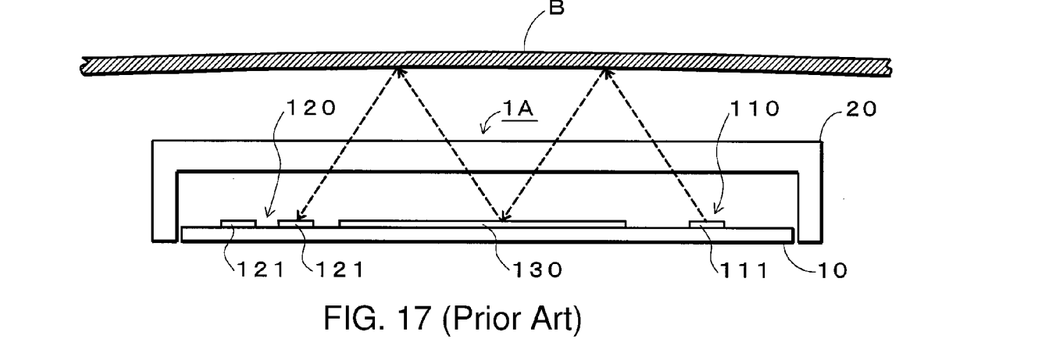
FIG. 17 is a diagram showing a state in which the substrate shown in FIG. 16 is accommodated in a radome and stored at a back side of the bumper.

FIG. 17 is a cross sectional view showing a state where the substrate 10 shown in FIG. 16 is accommodated in a radome 20 and stored at the back side of the bumper of the vehicle. In an example of this diagram, the radome 20 made of a resin having radio wave permeability is arranged to cover a surface of the substrate 10 on which the antennas are formed. The radar device 1A is arranged on the back side of a bumper B.

In such a state, as indicated by a broken line, a part of the radio wave transmitted from the transmitting antenna 110 is reflected by the bumper B, and then is incident on the GND copper foil section 130 and reflected thereon. Then, the part of the radio wave is reflected again by the bumper B, and thereafter is incident on the receiving antenna 120.

Figure 18:
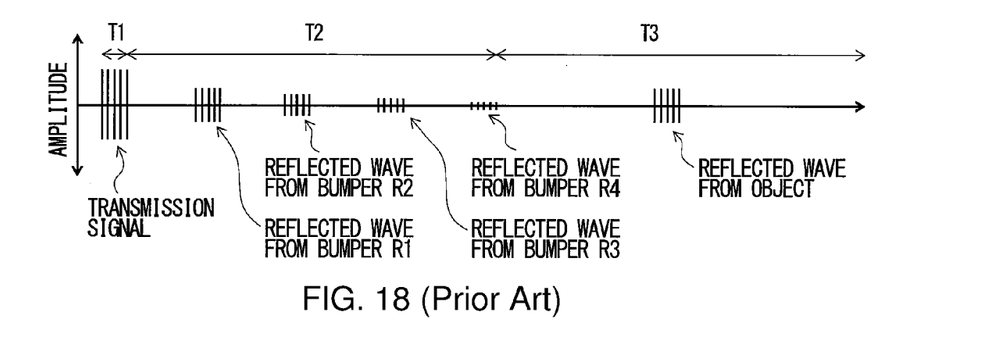
FIG. 18 is a diagram showing a relationship between a transmission signal, reflected waves from a bumper and a reflected wave from an object.

FIG. 18 is a diagram showing signals that are transmitted and received by the radar device 1A, and specifically shows a relationship between a transmission signal, reflected waves from a bumper, and a received signal which is a reflected wave from an object. In an example of this figure, the transmission signal is transmitted from the transmitting antenna 110 in a period T1, and the reflected wave from the bumper B is received several times (in this example, four times) in a subsequent period T2, while being attenuated. In a subsequent period T3, the reflected wave from the object (e.g., another vehicle) is received.

In this manner, when the reflected wave from the bumper B is received, there may be a case where the radar device 1A falsely detects it as an object. In the example of FIG. 18, the reflected waves from the bumper B and the reflected wave from the object are not temporally overlapped, but, in a case where they overlap, the reflected waves from the bumper B becomes a noise and the radar device 1A cannot detect the object accurately.

In the following cases, the reflected wave from the bumper B could obstruct the detection of the object. For example, in one case, a part of the radio wave transmitted from the transmitting antenna 110 is reflected on the bumper B, and then is incident on the GND copper foil section 130 and reflected thereon. Then, the part of the radio wave penetrates the bumper B, and is reflected by an object. Then, the part of the radio wave penetrates the bumper B again, and is incident on the receiving antenna 120. In another case, the radio wave transmitted from the transmitting antenna 110 penetrates the bumper B, and is reflected by an object. Then, the part of the radio wave penetrates the bumper B again, and is incident on the GND copper foil section 130 and reflected thereon. Then, the part of the radio wave is reflected on the bumper B, and is incident on the receiving antenna 120. The path of the reflected wave is not limited to the above, and there may be a case where the aforementioned reflections occur in a combined manner.

Accordingly, in order to solve such a problem, in the related art, there is a technique of reducing an influence of the bumper on a transmission signal by providing the bumper with an uneven geometry (Japanese Laid-Open Patent Publication No. 2008-249678).

There is also a technique of reducing an influence of a member such as a bumper, by controlling a modulation frequency of the transmission signal in such a manner that a reflection loss from the member such as the bumper is minimized (Japanese Laid-Open Patent Publication No. 2006-317162).

Further, there is also a technique in which a reflector is provided around an aperture in an array antenna unit, and an amount of shift of a beam or a null point is reduced by an existence of a radome (Japanese Laid-Open Patent Publication No. 2010-109890).

With the technique described in Patent Literature 1, since it is necessary to form a complicated geometry at the back side of the bumper, there is a drawback that a production cost of the bumper is increased.

With the technique described in Patent Literature 2, since the transmission frequency is adjusted, there is a drawback that it is not applicable to a radar having a fixed transmission frequency.

With the technique described in Patent Literature 3, there is a drawback that it is not possible to reduce an influence of reflection at an aperture of an array antenna.

Accordingly, the present disclosure relates to providing a radar device that can reduce an influence of a structure, such as a bumper that is constantly arranged on a transmission path, on a transmission signal or a received signal.

SUMMARY

According to an aspect of the present disclosure, a radar device configured and adapted to detect an object comprises a transmitting antenna, a receiving antenna, and a dummy antenna. The transmitting antenna is configured and adapted to transmit a high frequency signal. The receiving antenna is configured and adapted to receive a high frequency signal transmitted by the transmitting antenna and reflected by the object. The dummy antenna is configured and adapted to attenuate a high frequency signal transmitted by the transmitting antenna and reflected by a structural object, the structural object being constantly located within a transmission path of the high frequency signal. The dummy antenna is further configured and adapted to be selectable to perform at least one function in addition to the function of attenuating a high frequency signal.

With such a configuration, an influence of a structure on the transmission signal and the received signal can be reduced without processing a structure such as a bumper, which is constantly arranged on a transmission path, and even in a case of a fixed transmission frequency. Further, since the high frequency signal can be reduced by a dummy antenna, an influence on the transmission signal and the received signal can be reduced and an effective use of an antenna can be achieved.

Also, an effective utilization of antennas can be further promoted by making a dummy antenna configured and adapted to be selectable to perform at least one function in addition to the function of attenuating a high frequency signal.

For example, when transmitting a high frequency signal, by selecting the dummy antenna to function as a transmitting antenna, a greater transmission area for radio wave emission can be ensured, thus resulting in an improvement of the transmission efficiency. Further, when receiving the reflected wave, by selecting the dummy antenna to function as a receiving antenna, a greater receiving area for capturing a radio wave is ensured, thus resulting in an improvement in a reception gain.

Further, in addition to the aforementioned aspect, the structural object is a part on a vehicle in which the radar device is installed. Also, in addition to the aforementioned aspect, the structural object is a part of the radar device.

With such a configuration, by attenuating the reflected wave that is reflected by the structural object that is a part on a vehicle in which the radar device is installed and a part of the radar device, occurrence of false detections is reduced and no special processing is necessary for the structural objection, the production cost can be reduced.

Further, in addition to the aforementioned aspect, the dummy antenna is matched-terminated and is configured and adapted to attenuate a high frequency signal transmitted by the transmitting antenna and reflected by the structural object by receiving and converting the high frequency signal into heat.

With such a configuration, the high frequency signal can be attenuated by a simple configuration.

Further, in addition to the aforementioned aspect, the at least one function of the dummy antenna is transmitted a high frequency signal when the transmitting antenna is transmitting a high frequency signal. The dummy antenna is configured and adapted to attenuate a high frequency signal transmitted by at least one of the dummy and transmitting antennae and reflected by the structural object when the transmitting antenna is not transmitting a high frequency signal.

With such a configuration, since an occurrence of false detections is reduced and a dummy antenna is configured and adapted to function as a transmitting antenna, transmission efficiency can be improved.

Further, in addition to the aforementioned aspect, the dummy antenna is configured and adapted to attenuate a high frequency signal when a high frequency signal transmitted by the transmitting antenna and reflected by the structural object is incoming, the dummy antenna being match terminated when a high frequency signal transmitted by the transmitting antenna and reflected by the structural object is incoming. The at least function comprises receiving a high frequency signal when a high frequency signal transmitted by the transmitting antenna and reflected by the structural object is not incoming.

With such a configuration, since occurrence of false detections is reduced and a dummy antenna is configured and adapted to function as a receiving antenna, a reception gain can be improved.

Further, in addition to the aforementioned aspect, the at least one function comprises transmitting a high frequency signal when the transmitting antenna is transmitting a high frequency signal. The dummy antenna is configured and adapted to attenuate a high frequency signal when a high frequency signal transmitted by at least one of the dummy and transmitting antennae and reflected by the structural object is incoming. The dummy antenna is match terminated when a high frequency signal transmitted by at least one of the dummy and transmitting antennae and reflected by the structural object is incoming. The at least one function further comprises receiving a high frequency signal when the transmitting antenna is not transmitting a high frequency signal and a high frequency signal transmitted by at least one of the dummy and transmitting antennae and reflected by the structural object is not incoming.

With such a configuration, since occurrence of false detections is reduced and a dummy antenna is configured and adapted to function as a transmitting antenna, transmission efficiency can be improved and also since a dummy antenna is configured and adapted to function as a receiving antenna, a reception gain can be improved.

Further, in addition to the aforementioned aspect, the dummy antenna is configured and adapted to attenuate a high frequency signal transmitted by the transmitting antenna and reflected by the structural object by transmitting a signal having a same amplitude as and a phase opposite to the high frequency signal transmitted by the transmitting antenna and reflected by the structural object.

With such a configuration, occurrence of false detections can be reduced by cancelling out the reflected wave.

Further, according to an aspect of the present disclosure, the dummy antenna is configured and adapted to attenuate a high frequency signal transmitted by the transmitting antenna and reflected by the structural object by transmitting a signal having a same amplitude as and a phase opposite to the high frequency signal transmitted by the transmitting antenna and reflected by the structural object when the high frequency signal transmitted by the transmitting antenna and reflected by the structural object is incoming. The dummy antenna is matched-terminated when the dummy antenna is not transmitting a signal.

Also, in addition to the aforementioned aspect, the high frequency signal transmitted by the transmitting antenna is a signal containing a frequency from quasi-millimeter to millimeter wave band.

With such a configuration, since the transmitting antenna for sending a high frequency signal and the receiving antenna for receiving a high frequency signal can be constructed smaller, the radar device can be miniaturized.

According to the present disclosure, a radar device can be provided that can reduce an influence of the structure, such as a bumper, on the transmission signal and the received signal.

DETAILED DESCRIPTION

Hereinafter, embodiments of the present disclosure will be described.

(A) Basic Embodiment

Figure 1:
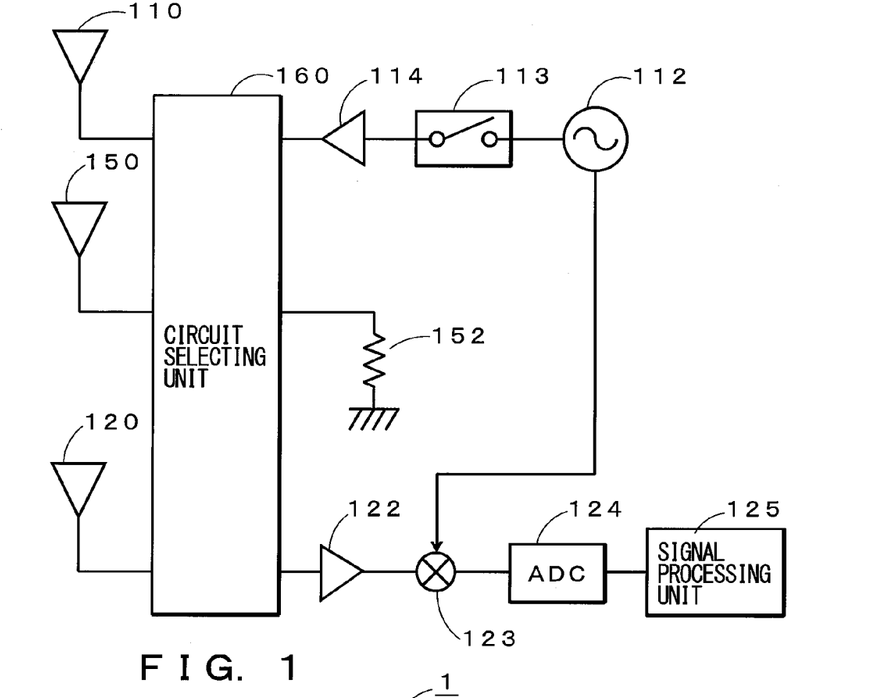
FIG. 1 is a block diagram showing an electrical configuration of a basic embodiment of the present disclosure.

First, referring to FIG. 1, a configuration of a circuit provided with an antenna in a radar device of a basic embodiment of the present disclosure will be described. FIG. 1 is a block diagram schematically showing a circuit of the radar device. As shown in FIG. 1, the radar device has a circuit formed therein that includes a transmitting antenna 110, a receiving antenna 120, a dummy antenna 150, and a circuit selecting section 160.

An oscillation section 112, a switch 113 and an amplifier 114 are connected to the transmitting antenna 110. The oscillation section 112 generates and outputs a signal in a high frequency band. The switch 113 switches the signal outputted from the oscillation section 112 in response to the control of a control unit, not shown, to generate a pulse signal and supply it to the amplifier 114. The amplifier 114 amplifies an electric power of the signal supplied from the switch 113 and supplies it to the transmitting antenna 110. The transmitting antenna 110 sends out the signal supplied from the amplifier 114 as a radio wave.

An amplifier 122, a mixer 123, an ADC (Analog to Digital Converter) 124 and a signal processing unit 125 are connected to the receiving antenna 120. The amplifier 122 amplifies and outputs an electric signal corresponding to the radio wave captured by the receiving antenna 120. The mixer 123 down-converts the signal outputted from the amplifier 122 by a signal of a high frequency band supplied from the oscillation section 112. The ADC 124 converts and outputs an electric signal (analog signal) outputted from the mixer 123 into a corresponding digital signal. The signal processing unit 125 detects a position, a distance, a velocity, etc., of the object by performing a predetermined process on the digital signal outputted from the ADC 124 and outputs them to a higher level device, not shown. In a case where it is driven at a low frequency, it is not necessary to provide the mixer 123.

Generally, a resistance element 152 is connected to the dummy antenna 150. The resistance element 152 is a resistance element for matched termination of the dummy antenna 150. Specifically, the resistance element 152 has a resistance value which is the same as a characteristic impedance of the dummy antenna 150, and one terminal thereof is connected to the dummy antenna 150 and the other terminal thereof is grounded. When a plurality of antenna units exists as the dummy antennas 150, one terminal of the resistance element 152 may be connected to each of the antenna units and the other terminal of the resistance element 152 may be grounded. The dummy antenna 150 is configured to be selectable as an antenna having another function by a circuit selecting unit 160.

The circuit selecting unit 160 is a function part with which the configuration of the antenna circuit of the radar device is selectable depending on the control of a control unit, not shown, and has a function of selecting the dummy antenna 150 to be connected to the amplifier 114 similarly to the transmitting antenna 110 or to be connected to the amplifier 122 similarly to the receiving antenna 120.

For example, when the circuit selecting unit 160 connects the dummy antenna 150 to the resistance element 152, the dummy antenna 150 implements the function of capturing and attenuating the reflected wave. Particularly, by connecting the dummy antenna 150 to the resistance element 152 in accordance with timing at which the transmission signal transmitted from the radar device 1 and reflected by the bumper B is incident on the radar device 1, the dummy antenna 150 functions as a noise attenuating antenna that captures and attenuates a noise that affects a received signal, which is a reflected wave from an object. In a case where the circuit selecting unit 160 selects a circuit such that the dummy antenna 150 is connected to the amplifier 114, the dummy antenna 150 functions as a transmitting antenna that sends out an electric signal outputted from the oscillation section 112. In a case where the circuit selecting unit 160 selects a circuit such that the dummy antenna 150 is connected to the amplifier 122, the dummy antenna 150 functions as a receiving antenna that captures and outputs a radio wave to the mixer 123.

It is to be note that the circuit selecting unit 160 need not possess all of the functions described above. For example, the circuit selecting unit 160 may have a configuration that has a function of selecting a circuit such that the dummy antenna 150 functions as the transmitting antenna 110 but does not have a function of selecting the circuit such that the dummy antenna 150 functions as the receiving antenna 120. On the other hand, the circuit selecting unit 160 may have a configuration that has a function of selecting a circuit such that the dummy antenna 150 functions as the receiving antenna 120 but does not have a function of selecting the circuit such that the dummy antenna 150 functions as the transmitting antenna 110.

Figure 2:
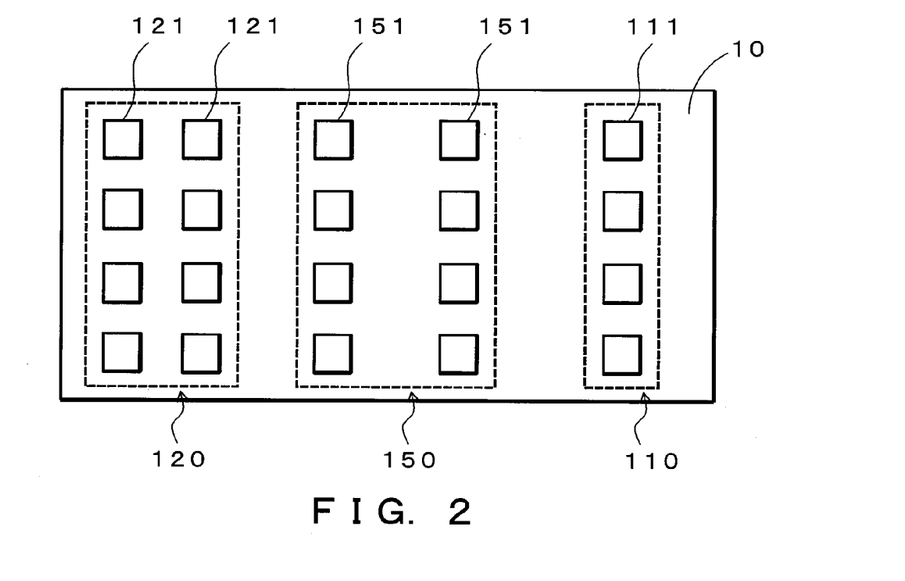
FIG. 2 is a diagram showing an exemplary configuration of the basic embodiment of the present disclosure.

FIG. 2 is a plan view showing a surface of the substrate 10 of the radar device 1 of a basic embodiment of the present disclosure on which antennas are formed. As shown in this figure, the transmitting antenna 110 is formed on the right-hand side (the right-hand side in FIG. 2) of the substrate 10 with a plurality of (in FIG. 2, four) antenna units 111 being arrayed. The receiving antenna 120 is formed on the left-hand side (the left-hand side in FIG. 2) of the substrate 10 with a plurality of (in FIG. 2, eight) antenna units 121 being arrayed. The dummy antenna 150 is formed at the center (at the center in FIG. 2) of the substrate 10 with a plurality of (in FIG. 2, eight) antenna units 151 being arrayed. Note that, in the example of FIG. 2, the transmitting antennas 110 has four units, the receiving antennas 120 has eight units, the dummy antennas 150 has eight units, but any other combination of numbers of units may be used. Further, the geometry of the antenna is not limited to the geometry shown in FIG. 2 and antennas having other geometries may be used. Among the constituent elements of the radar device, those constituent elements other than the antenna circuit (the transmitting antenna 110, the receiving antenna 120, and the dummy antenna 150) shown in FIG. 2 may be provided outside an antenna mounting region of the substrate 10, may be provided on a back surface of the substrate 10, or may be provided on a circuit board (not shown) that is different from the substrate 10.

Figure 3:
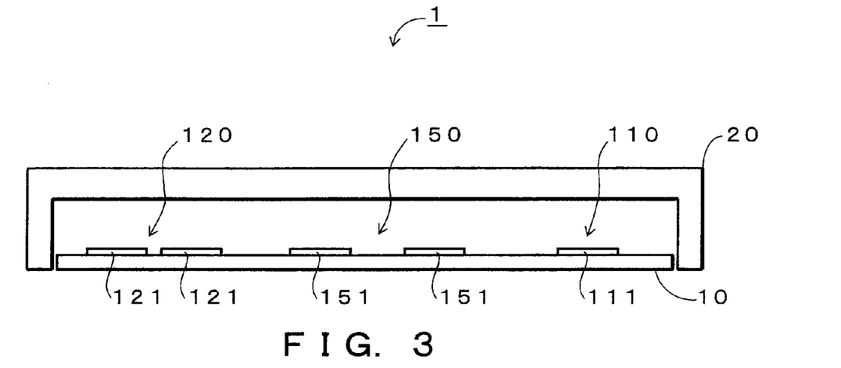
FIG. 3 is a cross sectional view showing a state where the substrate shown in FIG. 2 is accommodated in a radome.

FIG. 3 is a cross sectional view showing a state where the substrate 10 shown in FIG. 2 is accommodated in a radome 20. In the present example, the radome 20 is made of a resin having radio wave permeability and has a box shape. The substrate 10 is arranged in such a manner that a surface on which antennas are formed faces inwardly of the radome 20.

Note that, in the embodiment, a high frequency band refers to a band ranging from a quasi-millimeter wave to a millimeter wave. A resonant length L of the antenna is generally represented by Equation 1 or Equation 2 described below depending on the type of the antenna.

$$L = \frac{\lambda}{2 \times \sqrt{\varepsilon r}}$$ [Equation 1]

$$L = \frac{\lambda}{4 \times \sqrt{\varepsilon r}}$$ [Equation 2]

An element pitch W when arranging the antenna units in an array is generally represented by following Equation 3.

$$W < \lambda$$ [Equation 3]

In the equation, $\varepsilon r$ is a relative dielectric constant of the substrate and $\lambda$ is a wavelength of a signal in the high frequency band.

When a band of the high frequency signal sent out from the transmitting antenna 110 ranges from a quasi-millimeter wave to a millimeter wave, antenna areas of the transmitting antenna 110 and the receiving antenna 120, as well as the dummy antenna 150 can be reduced. For example, when a band of the high frequency signal is 24.15 GHz band, which is a quasi-millimeter wave band, and a relative dielectric constant of the substrate 10 is 4, the substrate 10 of the radar device 1 of the basic embodiment of FIG. 2 may be have a size of around 75 mm×90 mm in accordance with the above equations.

Figure 4:
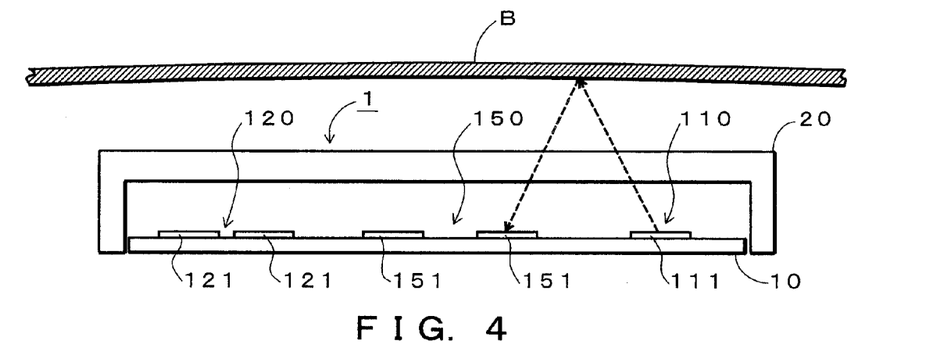
FIG. 4 is a diagram for explaining an operation of a basic embodiment of the present disclosure.

A basic operation of the embodiment will now be described. FIG. 4 is a diagram for explaining an operation of the basic embodiment of the present disclosure. As shown in this FIG. 4, a radio wave transmitted from the transmitting antenna 110 is reflected by the bumper B and is incident on the dummy antenna 150, as indicated by a broken line in FIG. 4. Since the dummy antenna 150 is matched-terminated as described above, the radio wave which is incident on the dummy antenna 150 is converted into heat by the resistance element 152 and thus most of the incident radio wave is not reflected. As a result, since the radio wave reflected by the bumper B is almost not incident on the receiving antenna 120, the reflected wave from the bumper B shown in FIG. 18 is drastically attenuated, and, a false detection by the radar device 1 can be prevented.

As described above, in the embodiment, since the matched-terminated dummy antenna 150 is provided on the substrate 10, the radio wave reflected by the bumper B can be prevented from being incident on the receiving antenna 120. Therefore, a false detection due to the reflected wave from the bumper B can be prevented. Also, in the example of FIG. 2, since the dummy antenna 150 is provided between the transmitting antenna 110 and the receiving antenna 120, the transmitting antenna 110 and the receiving antenna 120 are separated by the dummy antenna 150 that captures and attenuates the reflected wave from the bumper B that becomes a noise, and an influence of the reflected wave on the received wave can be reduced. With the function of the dummy antenna 150 being selectable in such a manner that the dummy antenna 150 functions as another antenna other than the noise attenuating antenna, an effective use of an antenna can be promoted while reducing an influence of a structure, such as a bumper, on the transmission signal and the received signal.

Figure 5:
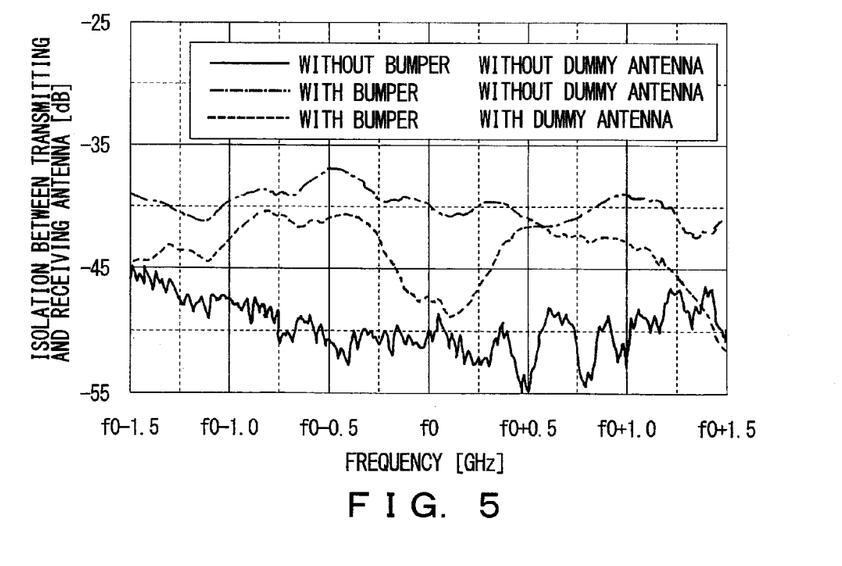
FIG. 5 is a graph showing an example of an isolation result of the transmitting antenna and the receiving antenna.

Referring to FIG. 5, an observation result of this embodiment will be described for a case where the high frequency band is a quasi-millimeter band. FIG. 5 is a graph showing a relationship between an isolation, which represents an amount of coupling between the transmitting antenna 110 and the receiving antenna 120 in the radar device 1, and a band of a signal that is sent out. In the graph, f0 indicates a frequency of the high frequency signal, which is 24.15 GHz here.

FIG. 5 shows an isolation result (solid line) for a case where the bumper B does not exist and the dummy antenna 150 is not provided, an isolation result (dash-dot line) for a case where the bumper B exists and the dummy antenna 150 is not provided, and an isolation result (broken line) for a case where the bumper B exists and the dummy antenna 150 is provided. In other words, in FIG. 5, an isolation between the transmitting antenna and the receiving antenna is used as an index indicating an influence of the bumper on the received signal. Note that the dummy antenna 150 that is described with reference to FIG. 5 is assumed to be a noise attenuating antenna. That is, in an electrical configuration in the radar device 1 shown in FIG. 1, the dummy antenna 150 that is described with reference to FIG. 5 is connected to the resistance element 152 by the circuit selecting unit 160, at an incident timing of the reflected wave from the bumper B.

As shown in FIG. 5, it can be seen that, as compared to a case where the bumper B does not exist, isolation is degraded by approximately 15 dB at a maximum due to an influence of the reflected wave produced by an existence of the bumper B. Further, in the presence of the bumper B, it can be seen that isolation is improved by providing the dummy antenna 150.

Figure 6:
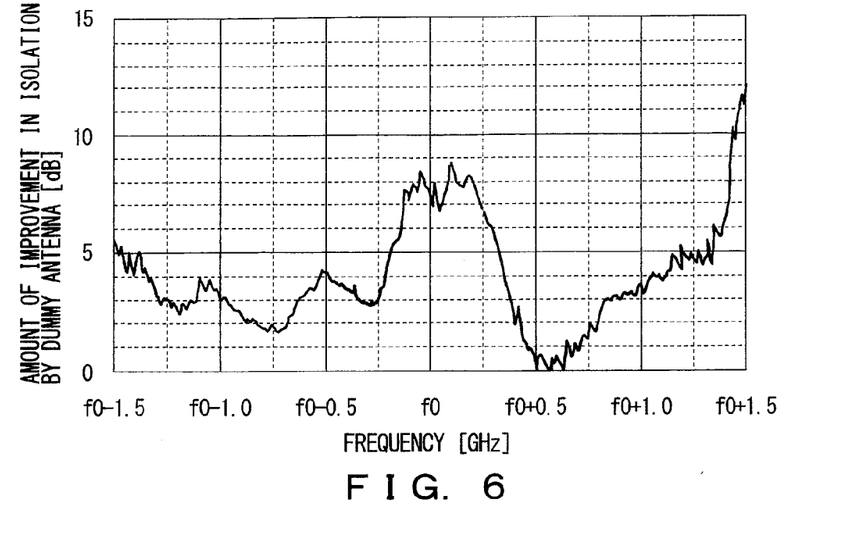
FIG. 6 is a graph showing an exemplary improvement in the isolation effect by the dummy antenna.

FIG. 6 shows an amount of improvement in an isolation result for a case where the dummy antenna 150 is provided in a state where the bumper B exists. FIG. 6 is a graph that has a horizontal axis representing the frequency of an emitted signal and a vertical axis representing an amount of improvement in the isolation result. As shown in FIG. 6, it can be seen that, by providing the dummy antenna 150, the isolation result is improved by approximately 12 dB at a maximum.

A detailed configuration and a function of each part of the radar device 1 of present disclosure are described with reference to first to fourth embodiments described below.

(B) First Embodiment

Figure 7:
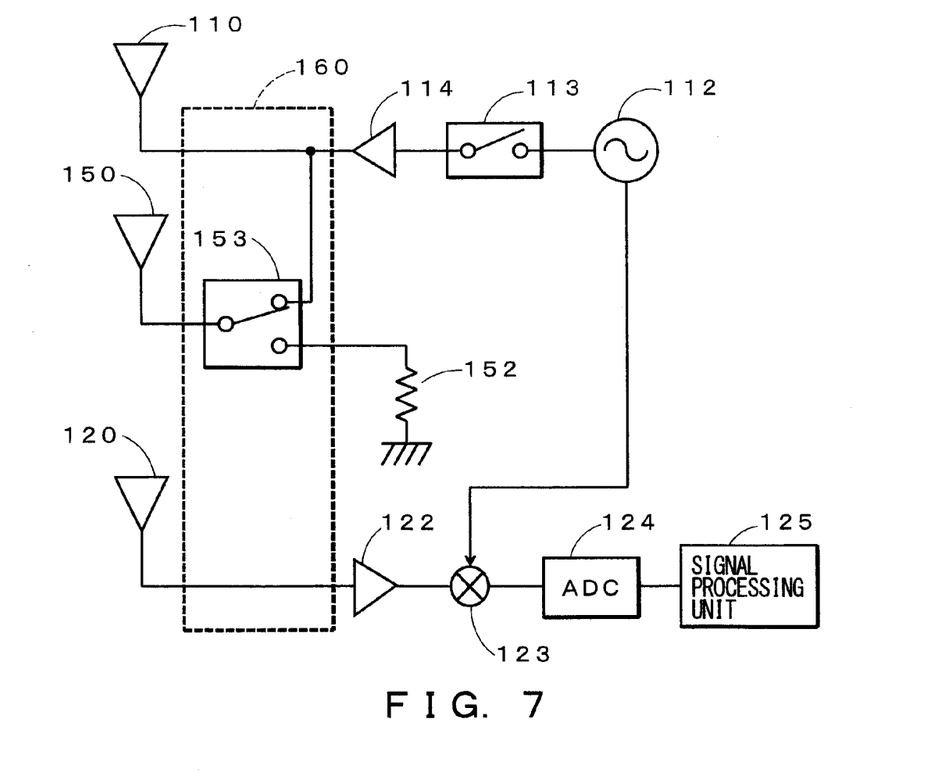
FIG. 7 is a block diagram showing an exemplary configuration of a first embodiment of the present disclosure.

The first embodiment of the present disclosure will be described. In the first embodiment, configurations of the substrate 10 and the radome 20 are similar to those shown in FIGS. 2 and 3, but an electrical configuration differs. FIG. 7 is a block diagram showing an example of the electrical configuration of the first embodiment. Note that, in this figure, parts corresponding to those shown in FIG. 1 are accompanied by the same reference numerals and descriptions thereof are omitted. As compared to FIG. 1, the first embodiment shown in FIG. 7 has a switch 153 as the circuit selecting unit 160. The switch 153 has a terminal connected to the dummy antenna 150 and two selective terminals, in which one of the selective terminals is connected to an output terminal of the amplifier 114 and the other selective terminal is connected to one of the terminals of the resistance element 152. The switch 153 is controlled to select an output terminal of the amplifier 114 during a period in which the high frequency signal is transmitted from the transmitting antenna 110, and to select a terminal of the resistance element 152 as the transmission is terminated. Note that the resistance element 152 is a termination resistance and has the same resistance value as a characteristic impedance of the dummy antenna 150.

Figure 8:
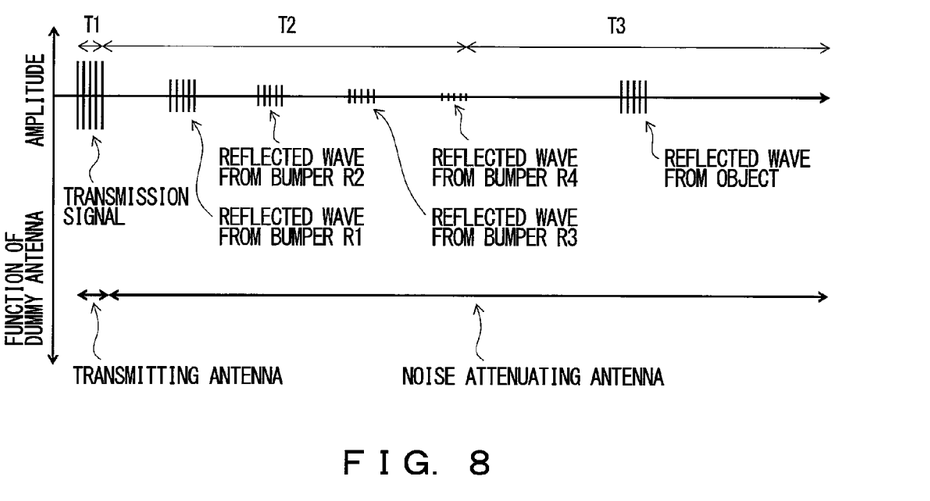
FIG. 8 is a diagram for explaining functions of the dummy antenna of the first embodiment.

An operation regarding the first embodiment will now be described with reference to FIG. 8. FIG. 8 is a diagram showing a function of the dummy antenna 150 of the first embodiment of the radar device 1. Specifically, FIG. 8 shows, at an upper part, a time-series relationship between a transmission signal, reflected waves R1 to R4 from the bumper B, and a received signal which is a reflected wave from an object, that are transmitted and received in the first embodiment of the radar device 1 similarly to FIG. 18, and shows, at a lower part, functions of the dummy antenna 150 at each timing.

In the first embodiment, in a period T1, shown in FIG. 8, during which a transmission signal is transmitted from the transmitting antenna 110, the dummy antenna 150 is connected to the amplifier 114 by the switch 153. Thereby, a signal outputted from the amplifier 114 is supplied to the transmitting antenna 110 and also supplied to the dummy antenna 150 via the switch 153, and as a result, the transmission signal is transmitted not only from the transmitting antenna 110 but also from the dummy antenna 150.

In a period T2 that is after the termination of the transmission of the transmission signal, the dummy antenna 150 is connected to the resistance element 152 by the switch 153. Thereby, the reflected waves R1 to R4 from the bumper B that have been incident on the dummy antenna 150 are supplied to the resistance element 152 and converted into heat there. As a result, since the radio wave reflected by the bumper B is attenuated, a false detection of the reflected wave from the bumper B can be prevented.

As can be seen from FIG. 8, in the first embodiment, the dummy antenna 150 is connected to the resistance element 152 in a period T3 as well. Since the reflected wave from the bumper B is attenuated also in the period T3, an influence on the received signal which is the reflected wave from the object can be reduced.

As has been described the above, in the first embodiment, with an operation of the switch 153, the dummy antenna 150 is made to function as a transmitting antenna in the period T1 and made to function as a noise attenuating antenna that attenuates the reflected wave from the bumper B by being matched-terminated in the periods T2 and T3. Thereby, when transmitting a high frequency signal, transmission efficiency can be improved by increasing an area of the transmitting antenna while reducing an influence of reflected waves R1 to R4 from the bumper B.

As has been described with reference to FIG. 8, the dummy antenna 150 is connected to the resistance element 152 throughout the periods T2 to T3, and when the first reflected wave R1 from the bumper B is attenuated by the dummy antenna 150, subsequent reflected waves R2 to R4 are attenuated in comparison to the example shown in FIG. 18. Therefore, the function as a noise attenuating antenna is sufficiently achieved.

Also, since levels of the reflected waves R2 to R4 are decreased, the period T3 can be made to start earlier by making the period T2 shorter as compared to FIG. 18. In this case, the received signal, which is a reflected wave from the object at a shorter distance, can be received without being influenced by a noise which is the reflected wave from the bumper B.

(C) Second Embodiment

Figure 9:
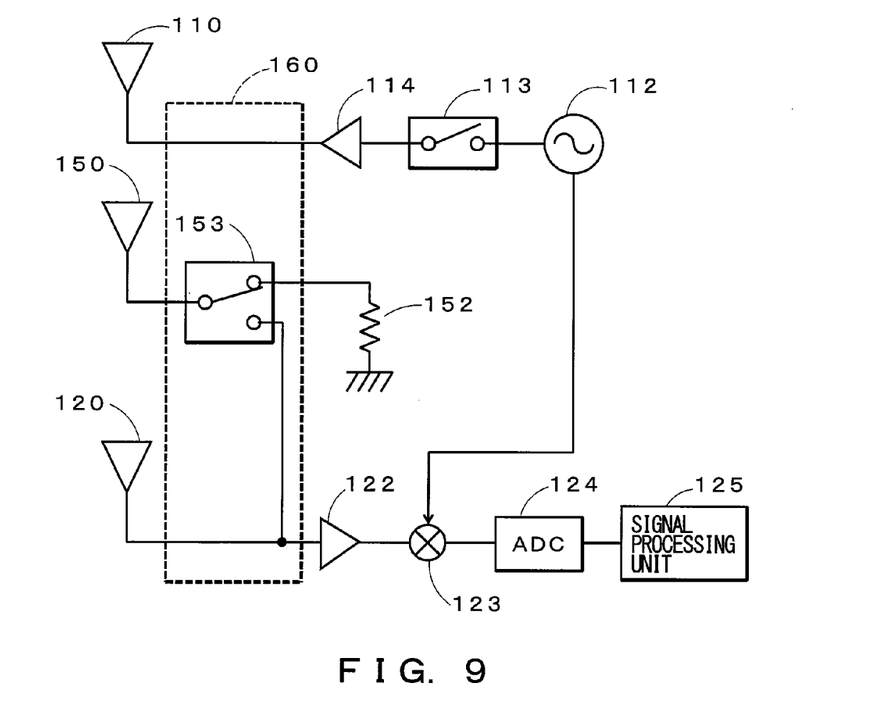
FIG. 9 is a block diagram showing an exemplary configuration of a second embodiment of the present disclosure.

The second embodiment of the present disclosure will be described. In the second embodiment, configurations of the substrate 10 and the radome 20 are similar to those shown in FIGS. 2 and 3, but an electrical configuration differs. FIG. 9 is a block diagram showing an example of the electrical configuration of the second embodiment. Note that, in this figure, parts corresponding to those shown in FIG. 1 are accompanied by the same reference numerals and descriptions thereof are omitted. As compared to FIG. 1, the second embodiment shown in FIG. 9 has a switch 153 as the circuit selecting unit 160. The switch 153 has a terminal connected to the dummy antenna 150 and two selective terminals, in which one of the selective terminals is connected to a terminal of the resistance element 152 and the other selective terminal is connected to an input terminal of the amplifier 122. The switch 153 is controlled by a control unit, not shown, to select an output of the resistance element 152 when a reflected wave from the bumper B is incoming and to select an input terminal of the amplifier 122 when a reflected wave from the object is incoming.

Figure 10:
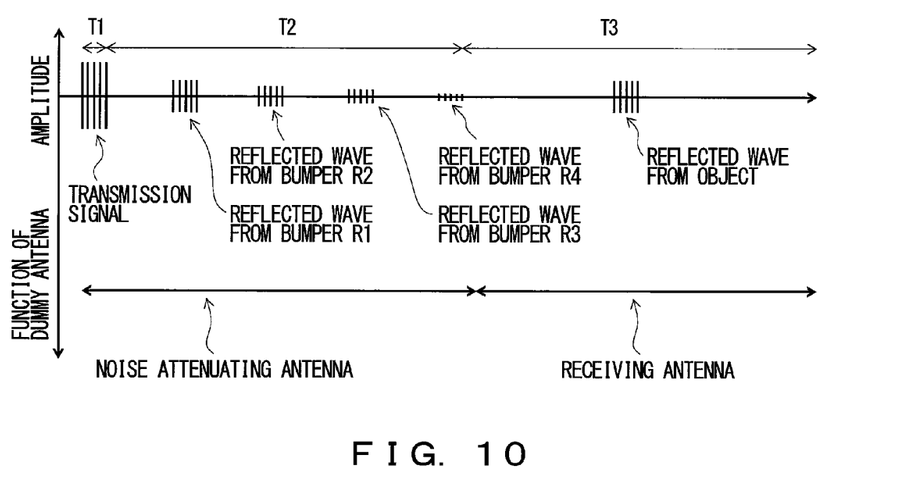
FIG. 10 is a diagram for explaining functions of the dummy antenna of the second embodiment.

An operation regarding the second embodiment will be described with reference to FIG. 10. FIG. 10 is a diagram showing a function of the dummy antenna 150 of the second embodiment of the radar device 1. Specifically, FIG. 10 shows, at an upper part, a time series relationship between the transmission signal, the reflected waves R1 to R4 from the bumper B, and a reflected wave (received signal) from an object, that are transmitted and received in the second embodiment of the radar device 1 similarly to FIG. 18, and shows, at a lower part, functions of the dummy antenna 150 at each timing.

In the second embodiment, the dummy antenna 150 is connected to the resistance element 152 by the switch 153 in the periods T1 and T2 in FIG. 10. Thereby, the reflected waves R1 to R4 from the bumper B that are incident on the dummy antenna 150 are supplied to the resistance element 152, and are converted into heat there. As a result, since the radio wave reflected by the bumper B is attenuated, the reflected wave from the bumper B can be prevented from being falsely detected as the received wave.

In the period T3 during which the reflected wave from an object is incoming, the dummy antenna 150 is connected to the amplifier 122 by the switch 153. Thereby, not only the reflected wave from the object that is incident on the receiving antenna 120 but also the reflected wave from the object that is incident on the dummy antenna 150 is supplied to the amplifier 122. As a result, by increasing an area of the receiving antenna to increases a reception gain, a detecting distance can be increased.

As shown in FIG. 10, in the second embodiment, the dummy antenna 150 is connected to the resistance element 152 also in the period T1, during which the transmission signal is transmitted from the transmitting antenna 110. Thereby, since the reflected wave from the bumper B is also attenuated in the period T1, for example when a cycle of T1 to T3 in FIG. 10 is repeated, a reflected wave produced by a reflection of the transmission signal, which was transmitted in the previous cycle, on the bumper B can be attenuated and an influence on the received signal can be reduced.

As has been described above, in the second embodiment, the dummy antenna 150 is matched-terminated in periods T1 and T2 to function as a noise attenuating antenna that attenuates the reflected wave from the bumper B, and to function as a receiving antenna in the period T3. Thereby, while it is possible to attenuate the reflected wave from the bumper B by converting it into heat and to suppress an influence of the reflected wave, a detection distance can be increased by increasing an area of the receiving antenna and by increasing a reception gain at the time of reception of the received signal.

As has been described with reference to FIG. 10, the switch 153 is connected to the resistance element 152 throughout the periods T1 to T2, and when the first reflected wave R1 from the bumper B is attenuated by the dummy antenna 150, subsequent reflected waves R2 to R4 are attenuated in comparison to the example shown in FIG. 18. Therefore, the function as a noise attenuating antenna is sufficiently achieved.

Also, since levels of the reflected waves R2 to R4 are decreased, the period T3 can be started earlier by making the period T2 shorter in comparison to FIG. 18. In this case, the received signal which is the reflected wave from the object at a shorter distance can be received without being influenced by the reflected wave.

(D) Third Embodiment

Figure 11:
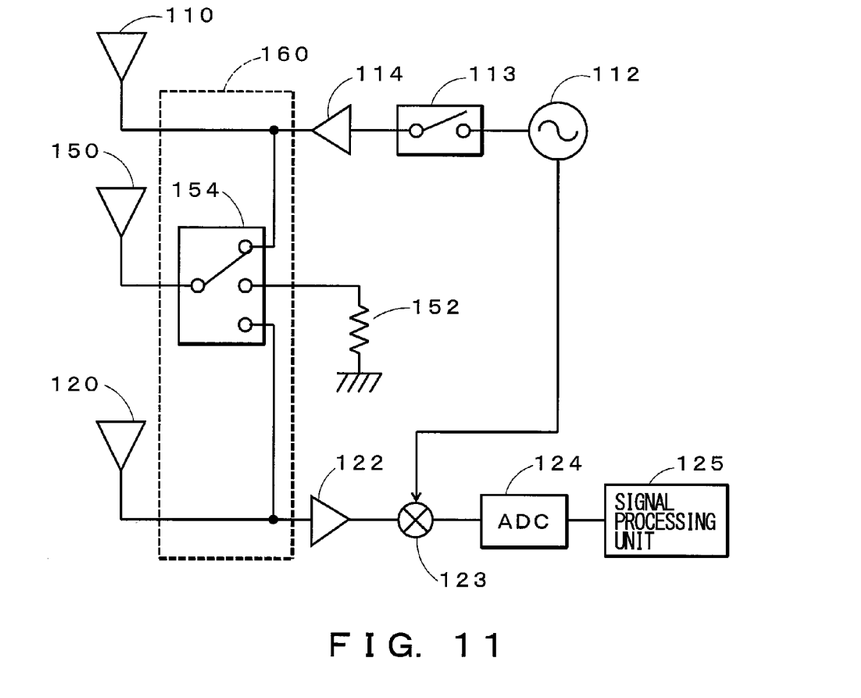
FIG. 11 is a block diagram showing an exemplary configuration of a third embodiment of the present disclosure.

The third embodiment of the present disclosure will be described. In the third embodiment, configurations of the substrate 10 and the radome 20 are similar to those shown in FIGS. 2 and 3, but an electrical configuration differs. FIG. 11 is a block diagram showing an example of the electrical configuration of the third embodiment. Note that, in this figure, parts corresponding to those shown in FIG. 1 are accompanied by the same reference numerals and the descriptions thereof are omitted. As compared to FIG. 1, the third embodiment shown in FIG. 11 has a switch 154 as the circuit selecting unit 160. The switch 154 has a terminal connected to the dummy antenna 150 and three selective terminals, in which one of the selective terminals arranged upper most in the figure is connected to an output terminal of the amplifier 114, a middle selective terminal is connected to the resistance element 152, and a selective terminal arranged lower most in the figure is connected to an input terminal of the amplifier 122.

Figure 12:
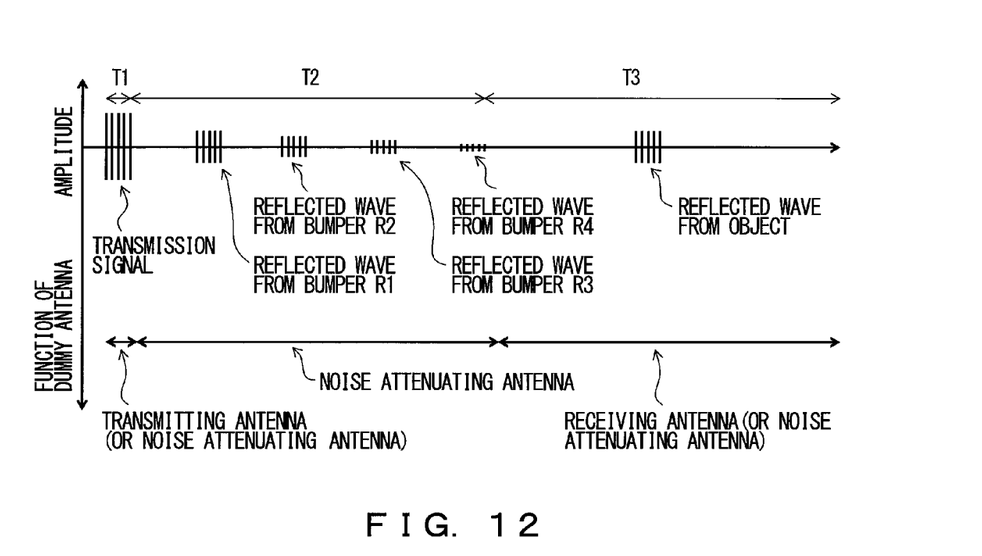
FIG. 12 is a diagram for explaining functions of the dummy antenna of the third embodiment.

An operation regarding the third embodiment will be described. FIG. 12 is a diagram showing a function of the dummy antenna 150 of the third embodiment of the radar device 1. Specifically, FIG. 12 shows, at an upper part, a time series relationship between a transmission signal, reflected waves R1 to R4 from the bumper B, and a reflected wave (received signal) from an object that are transmitted and received in the third embodiment of the radar device 1 similarly to FIG. 18, and, at a lower part, functions of the dummy antenna 150 at each timing.

In the third embodiment, the dummy antenna 150 is connected to the amplifier 114 by the switch 154 in the period T1 in FIG. 12. Thereby, the transmission signal is transmitted from the dummy antenna 150 similarly to the transmitting antenna 110. In the period T2, the dummy antenna 150 is connected to the resistance element 152 by the switch 154. Thereby, the reflected waves R1 to R4 from the bumper B that are incident on the dummy antenna 150 are converted into heat by the resistance element 152 and attenuated. In the period T3, the dummy antenna 150 is connected to the amplifier 122 by the switch 154. Thereby, the received signal that is incident on the dummy antenna 150 is, similarly to the signal received by the receiving antenna 120, outputted to the amplifier 122.

As has been described above, in the third embodiment, by an operation of the switch 154, the dummy antenna 150 functions as a transmitting antenna in the period T1, functions as a noise attenuating antenna that attenuates the reflected wave from the bumper B by being matched-terminated in the period T2, and functions as a receiving antenna in the period T3. Accordingly, transmission efficiency is improved by increasing an area of the transmitting antenna when transmitting radio waves, an influence of the reflected waves is suppressed by converting the incoming reflected waves into heat to attenuate the reflected wave in a period during which the reflected waves R1 to R4 from the bumper B are incoming, and a detection distance can be increased by increasing an area of the receiving antenna to increase the reception gain when receiving the received signal.

As has been described with reference to FIG. 12, the dummy antenna 150 is connected to the resistance element 152 throughout the period T2, and when the first reflected wave R1 from the bumper B is attenuated by the dummy antenna 150, subsequent reflected waves R2 to R4 are attenuated in comparison to the example shown in FIG. 18. Therefore, the function as a noise attenuating antenna is sufficiently achieved.

Since levels of the reflected waves R2 to R4 are decreased, the period T3 can be made to start earlier by making the period T2 shorter as compared to FIG. 18. In this case, the received signal which is the reflected wave from the object at a shorter distance can be received without being influenced by a noise which is the reflected wave from the bumper B.

(E) Fourth Embodiment

Figure 13:
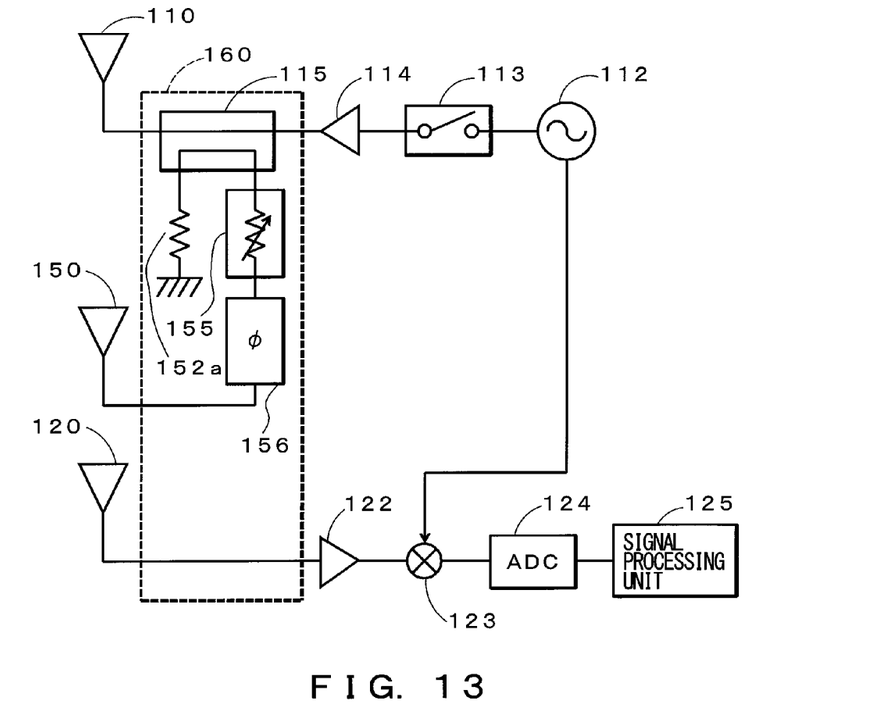
FIG. 13 is a block diagram showing an exemplary configuration of a fourth embodiment of the present disclosure.

The fourth embodiment of the present disclosure will be described. In the fourth embodiment, configurations of the substrate 10 and the radome 20 are similar to those shown in FIGS. 2 and 3, but an electrical configuration differs. FIG. 13 is a block diagram showing an example of the electrical configuration of the fourth embodiment. Note that, in this figure, parts corresponding to those shown in FIG. 1 are accompanied by the same reference numerals and descriptions thereof are omitted. As compared to FIG. 1, the fourth embodiment shown in FIG. 13 has a configuration that has a coupler 115, a resistance element 152a, an attenuator 155 and a phase shifter 156 as the circuit selecting unit 160. The remaining configuration is similar to the case of FIG. 1. Here, the coupler 115 distributes and outputs a part of the signal outputted from the amplifier 114 to the attenuator 155 side. The resistance element 152a terminates the coupler 115. The attenuator 155 attenuates and outputs the signal outputted from the coupler 115 by a predetermined amount. The phase shifter 156 shifts and outputs a phase of the signal outputted from the attenuator 155 by a predetermined amount. The dummy antenna 150 transmits the signal outputted from the phase shifter 156 as a radio wave for cancelling out the reflected wave from the bumper B (hereinafter, referred to as a cancellation signal C). That is to say, the fourth embodiment is a variant configuration example in which, in a circuit structure of the basic embodiment of the radar device 1 of the present disclosure shown in FIG. 1, the resistance element 152 is replaced with the coupler 115, the resistance element 152a and the attenuator 155 and the phase shifter 156.

Figure 14:
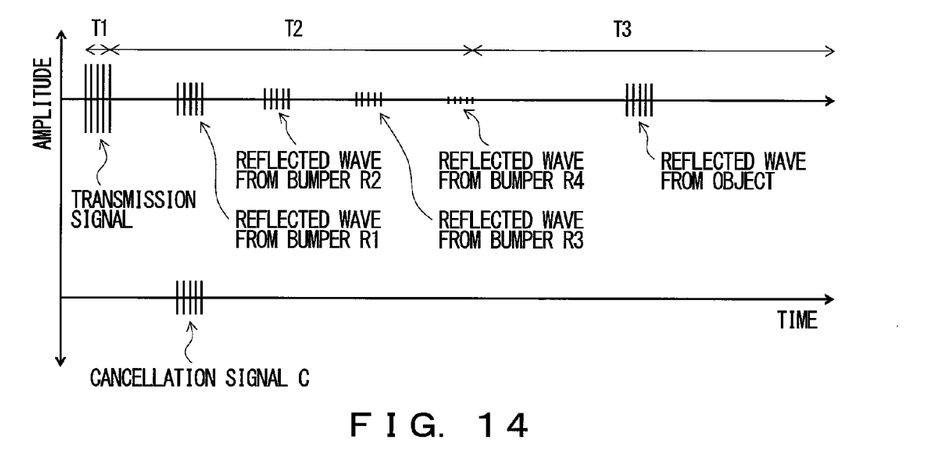
FIG. 14 is a diagram showing a relationship between a transmission signal, reflected waves from a bumper, and a reflected wave from an object in the fourth embodiment.

An operation regarding the fourth embodiment will be described. FIG. 14 is a diagram showing signals that are transmitted and received in the fourth embodiment of the radar device 1, and specifically showing a relationship between the transmission signal, the reflected waves from the bumper, and the reflected wave (received signal) from an object. In other words, FIG. 11 shows, at an upper part, amplitude and time of each of a transmission signal from the radar device 1, reflected waves from the bumper B, and a reflected wave from an object similarly to FIG. 14, and, at a lower part, amplitude and time of a cancellation signal C transmitted from the dummy antenna 150 of the fourth embodiment.

In the example of FIG. 14, in the period T1, the transmission signal is transmitted from the transmitting antenna 110 and, in the subsequent period T2, the reflected wave from the bumper B is received several times (in FIG. 14, four times) while being attenuated. The reflected wave from an object (e.g., another vehicle) is received in the subsequent period T3.

In the fourth embodiment, as shown in the lower part of FIG. 14, the cancellation signal C, which is a radio wave for cancelling out the reflected wave R1 from the bumper B, is transmitted from the dummy antenna 150. In other words, at the timing when the first reflected wave R1 from the bumper B in the period T2 is incident on the dummy antenna 150, a cancellation signal C having the same intensity as the reflected wave R1 and a phase which is 180 degrees out of phase is transmitted from the dummy antenna 150 and cancels out the reflected wave R1. Thereby, an influence of the reflected wave R1 is decreased and the reflected wave R1 which is reflected by the substrate 10 is further reflected on the bumper B, and an influence of further reflected waves R2 to R4 which are incident on the receiving antenna 120 can also be decreased.

More specifically, in the fourth embodiment of the radar device 1, most of the signals outputted from the amplifier 114 is transmitted via the transmitting antenna 110 in the period T1. A part of the signal outputted from the amplifier 114 is distributed by the coupler 115 and is supplied to the attenuator 155. After attenuating the signal outputted from the coupler 115 by a predetermined amount, the attenuator 155 outputs it to the phase shifter 156. In the phase shifter 156, the inputted signal is phase shifted (delayed) and outputted. The signal outputted from the phase shifter 156 is transmitted as a cancellation signal C via the dummy antenna 150. The cancellation signal C transmitted from the dummy antenna 150 is adjusted by the attenuator 155 in such a manner that it has the same amplitude as the first reflected wave R1 from the bumper B, and adjusted by the phase shifter 156 in such a manner that it is phase shifted by 180 degrees and emitted at a timing when the reflected wave R1 is incident on the dummy antenna 150. With such a cancellation signal C, the reflected wave R1 is cancelled out. As a result, the reflected waves R1 to R4 from the bumper in the period T2 are attenuated.

As has been described above, with the fourth embodiment, an influence of the reflected wave can be decreased, since an output signal from the amplifier 114 is partly distributed by the coupler 115 and attenuated by the attenuator 155 and thereafter phase shifted by the phase shifter 156, outputted from the dummy antenna 150 and attenuated by cancelling out the reflected wave.

Note that, the fourth embodiment may also be configured in such a manner that a destination of connection of the dummy antenna 150 can be changed using the circuit selecting unit 160.

For example, one of the selective terminals of a switch connected to the dummy antenna 150 may be connected to an output terminal of the phase shifter 156 and the other selective terminal may be connected to an input terminal of the amplifier 122. In a case of such a configuration, in the period T2 in FIG. 14, the reflected wave from the bumper B can be attenuated by selecting a terminal of the switch on the phase shifter 156 side to cause the cancellation signal C to be emitted from the dummy antenna 150. In the period T3, by selecting a terminal of the switch on the amplifier 122 side, the dummy antenna 150 can be made to function as a receiving antenna to thereby increase an area of the receiving antenna and to increase a reception gain.

One of the selective terminals of the switch connected to the dummy antenna 150 may be connected to an output terminal of the phase shifter 156, and the other selective terminal may be connected to an output terminal of the coupler 115 on the transmitting antenna 110 side. With such a configuration, by selecting a terminal of the switch on the coupler 115 side in the period T1 in FIG. 14, it functions as a transmitting antenna and transmission efficiency can be improved. In the period T2, the reflected wave from the bumper B can be attenuated by emitting the cancellation signal C from the dummy antenna 150.

One of the selective terminals of the switch connected to the dummy antenna 150 may be connected to an output terminal of phase shifter 156, and the other selective terminal may be connected to the resistance element 152 for matched termination of the dummy antenna 150 shown in FIG. 1 or the like. With such a configuration, the dummy antenna 150 may function as an antenna emitting the cancellation signal C during a part of the period T2 in FIG. 14 only (e.g., a timing when the first reflected wave R1 from the bumper B is incoming) and, in the remaining period, may function as a noise attenuating antenna that captures and attenuates the reflected wave. With such a configuration, an influence of the reflected wave from the bumper B can be further reduced.

Figure 15:
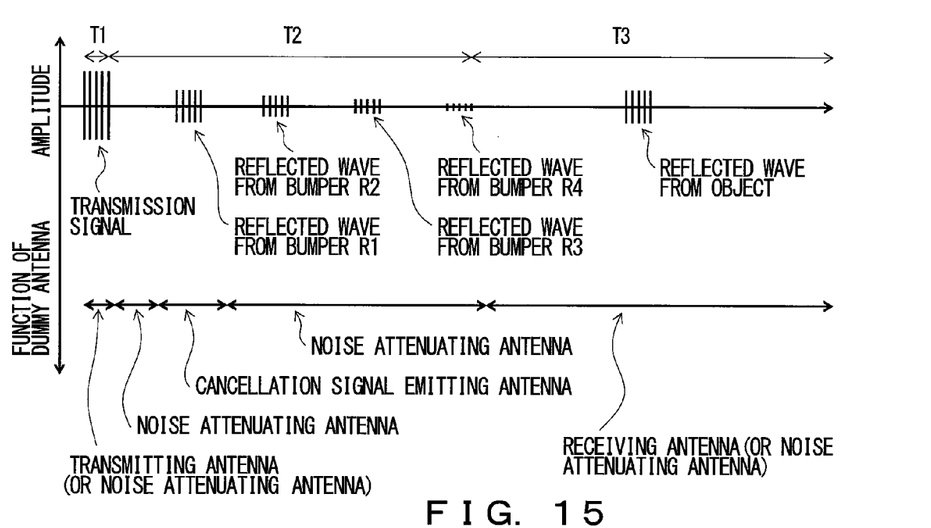
FIG. 15 is a diagram for explaining functions of the dummy antenna of the fourth embodiment.

Note that it may be configured by combining the aforementioned configurations. In other words, as shown in FIG. 15, it has a configuration in which destination of connection is appropriately selected by the circuit selecting unit 160 in such a manner that the dummy antenna 150 functions as a transmitting antenna in the period T1, functions as an antenna that transmits a cancellation signal C at a timing in the period T2 when the first reflected wave R1 from the bumper B is incoming, functions as a noise attenuating antenna that captures and attenuates the reflected wave in the remaining period of the period T2, and functions as the receiving antenna in the period T3.

Since levels of the reflected waves R2 to R4 are decreased, the period T3 can be made to start earlier by shortening the period T2 as compared to FIG. 18. In this case, the receiving signal which is the reflected wave from the object at a shorter distance can be received without being influenced by the noise which is the reflected wave from the bumper B.

The cancellation signal C transmitted from the dummy antenna 150 does not need to be intended for cancelling out the first reflected wave R1 from the bumper B, and may be adjusted to cancel out other reflected waves (e.g., reflected waves R2 to R4). For example, the dummy antenna 150 may be configured to transmit, at the timing when the reflected wave R2 is incident on the dummy antenna 150, a cancellation signal C which is adjusted by the attenuator 155 and the phase shifter 156 such that it has the same amplitude as the reflected wave R2 and has a phase that differs by 180 degrees. When at least one of the reflected waves R1 to R4 from the bumper B can be attenuated by the cancellation signal C, an influence of the reflected wave from the bumper B can be decreased. Of course, a plurality of reflected waves among the reflected waves R1 to R4 may be attenuated by the cancellation signal C.

(F) Variant Embodiment

Note that each of the aforementioned embodiments is given by way of example, and various variant embodiments exist. For example, the geometry, the number of units and the arrangement of the transmitting antenna 110, the receiving antenna 120 and the dummy antenna 150 shown in FIG. 2 are given by way of example, and other configuration is also conceivable. For example, the transmitting antenna, the receiving antenna and the dummy antenna need not be formed separate, and all of them may be formed integral or two types among them may be formed integral. The structure of the antenna itself need not be formed on a printed circuit board, but may be configured as various antennas including a horn antenna. The arrangement of the transmitting antenna, the dummy antenna, and the receiving antenna may be interchanged. The dummy antenna may be arranged around the transmitting antenna and the receiving antenna. Each antenna need not be arranged on the same plane.

Further, the position where the dummy antenna is arranged not limited thereto, and for example, the configuration may be such that the dummy antenna is arranged on a structure such as a bumper or a radome.

Further, a switch used for selecting between the dummy antenna and the receiving and transmitting antennas may be configured to be switched by a machine type switch or an electronic type switch.

Further, in the aforementioned description, the bumper B was described as an example of the member by which the transmitting antenna 110 is reflected, but the present disclosure is also applicable to a case in which the radio wave is reflected by a member other than the bumper (e.g., an emblem). That is to say, for example, in the present disclosure, "a structure constantly arranged on a transmission path of the high frequency signal" is not limited to the bumper B, and may also include, for example, an emblem, a radome constituting the radar device 1 or the like.

In FIGS. 11 and 14, a case in which there are four reflected waves from the bumper B was shown by way of example, but the number of reflected waves may be other than this (1 to 3 waves or five or more waves). Also, in FIGS. 11 and 14, a case in which the reflected wave from the bumper B and the reflected wave from an object are not superposed was explained by way of example, but the present disclosure is also applicable to a case where they are superposed.

What is claimed is:

1. A radar device configured and adapted to detect an object, comprising:
   a transmitting antenna configured and adapted to transmit a high frequency signal;
   a receiving antenna configured and adapted to receive a high frequency signal transmitted by the transmitting antenna and reflected by the object; and
   a dummy antenna configured and adapted to attenuate a high frequency signal transmitted by the transmitting antenna and reflected by a structural object, the structural object being constantly located within a transmission path of the high frequency signal,
   the dummy antenna being further configured and adapted to be selectable to perform at least one function in addition to the function of attenuating a high frequency signal.

2. The radar device according to claim 1, wherein the structural object is a part on a vehicle in which the radar device is installed.

3. The radar device according to claim 2, wherein the structural object is a part of the radar device.

4. The radar device according to claim 1, wherein the dummy antenna is matched-terminated, the dummy antenna being configured and adapted to attenuate a high frequency signal transmitted by the transmitting antenna and reflected by the structural object by receiving and converting the high frequency signal into heat.

5. The radar device according to claim 1, wherein the at least one function comprises transmitting a high frequency signal when the transmitting antenna is transmitting a high frequency signal, the dummy antenna being configured and adapted to attenuate a high frequency signal transmitted by at least one of the dummy and transmitting antennae and reflected by the structural object when the transmitting antenna is not transmitting a high frequency signal, the dummy antenna being match terminated when the transmitting antenna is not transmitting a high frequency signal.

6. The radar device according to claim 1, wherein the dummy antenna is configured and adapted to attenuate a high frequency signal when a high frequency signal transmitted by the transmitting antenna and reflected by the structural object is incoming, the dummy antenna being match terminated when a high frequency signal transmitted by the transmitting antenna and reflected by the structural object is incoming, the at least one function comprising receiving a high frequency signal when a high frequency signal transmitted by the transmitting antenna and reflected by the structural object is not incoming.

7. The radar device according to claim 1, wherein the at least one function comprises transmitting a high frequency signal when the transmitting antenna is transmitting a high frequency signal, the dummy antenna being configured and adapted to attenuate a high frequency signal when a high frequency signal transmitted by at least one of the dummy and transmitting antennae and reflected by the structural object is incoming, the dummy antenna being match terminated when a high frequency signal transmitted by at least one of the dummy and transmitting antennae and reflected by the structural object is incoming, the at least one function further comprising receiving a high frequency signal when the transmitting antenna is not transmitting a high frequency signal and a high frequency signal transmitted by at least one of the dummy and transmitting antennae and reflected by the structural object is not incoming.

8. The radar device according to claim 1, wherein the dummy antenna is configured and adapted to attenuate a high frequency signal transmitted by the transmitting antenna and reflected by the structural object by transmitting a signal having a same amplitude as and a phase opposite to the high frequency signal transmitted by the transmitting antenna and reflected by the structural object.

9. The radar device according to claim 8, wherein the dummy antenna is configured and adapted to attenuate a high frequency signal transmitted by the transmitting antenna and reflected by the structural object by transmitting a signal having a same amplitude as and a phase opposite to the high frequency signal transmitted by the transmitting antenna and reflected by the structural object when the high frequency signal transmitted by the transmitting antenna and reflected by the structural object is incoming, the dummy antenna being matched-terminated when the dummy antenna is not transmitting a signal.

10. The radar device according to claim 1, wherein the high frequency signal transmitted by the transmitting antenna is a signal containing a frequency from quasi-millimeter to millimeter wave band.

\* \* \* \* \*